United States Patent
Misawa et al.

(10) Patent No.: US 11,909,164 B2
(45) Date of Patent: Feb. 20, 2024

(54) OPTICAL PULSE PAIR GENERATOR, LIGHT DETECTION DEVICE, AND LIGHT DETECTION METHOD

(71) Applicant: National University Corporation Tokyo University of Agriculture & Technology, Tokyo (JP)

(72) Inventors: Kazuhiko Misawa, Fuchu (JP); Terumasa Ito, Fuchu (JP)

(73) Assignee: NATIONAL UNIVERSITY CORPORATION TOKYO UNIVERSITY OF AGRICULTURE AND TECHNOLOGY, Tokyo (JP)

( * ) Notice: Subject to any disclaimer, the term of this patent is extended or adjusted under 35 U.S.C. 154(b) by 751 days.

(21) Appl. No.: 17/054,849

(22) PCT Filed: Apr. 19, 2019

(86) PCT No.: PCT/JP2019/016860
§ 371 (c)(1),
(2) Date: Nov. 12, 2020

(87) PCT Pub. No.: WO2019/220863
PCT Pub. Date: Nov. 21, 2019

(65) Prior Publication Data
US 2021/0218215 A1    Jul. 15, 2021

(30) Foreign Application Priority Data
May 14, 2018   (JP) .................................. 2018-093067

(51) Int. Cl.
*H01S 3/00* (2006.01)
*G02B 21/06* (2006.01)
(Continued)

(52) U.S. Cl.
CPC ........... *H01S 3/0057* (2013.01); *G01N 21/65* (2013.01); *G02B 21/06* (2013.01);
(Continued)

(58) Field of Classification Search
CPC ...... H01S 3/0057; G01N 21/65; G02B 21/06; G01S 11/00
See application file for complete search history.

(56) References Cited

FOREIGN PATENT DOCUMENTS

JP    2009-150649 A    7/2009

OTHER PUBLICATIONS

Volkmer et al., "Time-resolved coherent anti-Stokes Raman scattering microscopy: Imaging based on Raman free Induction decay," Applied Physics Letters, 80 (9): 1505-1507 (2002).
(Continued)

*Primary Examiner* — Ryan D Howard
(74) *Attorney, Agent, or Firm* — Morgan, Lewis & Bockius LLP

(57) ABSTRACT

An optical pulse pair generator is configured to generate an optical pulse pair including a first pulse beam and a second pulse beam having respective central wavelengths that are separated by a predetermined wavelength difference from each other and having target time waveforms that are substantially the same as each other. The optical pulse pair generator provided includes a splitter section configured to split an incident pulse beam into two, a first shaping section configured to shape one of the pulse beams split by the splitter section by shaping into the target time waveform and setting a central frequency so as to configure the first pulse beam, and a second shaping section configured to shape the other of the pulse beams split by the splitter section by shaping into the target time waveform so as to configure the second pulse beam.

11 Claims, 8 Drawing Sheets

(51) Int. Cl.
*G01N 21/65* (2006.01)
*G02B 27/10* (2006.01)
*H01S 3/30* (2006.01)

(52) U.S. Cl.
CPC ........ *G02B 27/1006* (2013.01); *H01S 3/0078* (2013.01); *H01S 3/30* (2013.01)

(56) References Cited

OTHER PUBLICATIONS

Upputuri et al., "Chirped time-resolved CARS microscopy with square-pulse excitation," Optics Express, 22 (8): 9611-9626 (2014).
Ito et al., "Single-beam phase-modulated stimulated Raman scattering microscopy with spectrally focused detection," Journal of the Optical Society of America B, 34 (5): 1004-1015 (2017).
Hellerer et al., "Spectral focusing: high spectral resolution spectroscopy with broad-bandwidth laser pulses," Applied Physics Letters, 85 (1): 25-27 (2004).
International Search Report issued in corresponding International Patent Application No. PCT/JP2019/016860 dated Jun. 11, 2019.

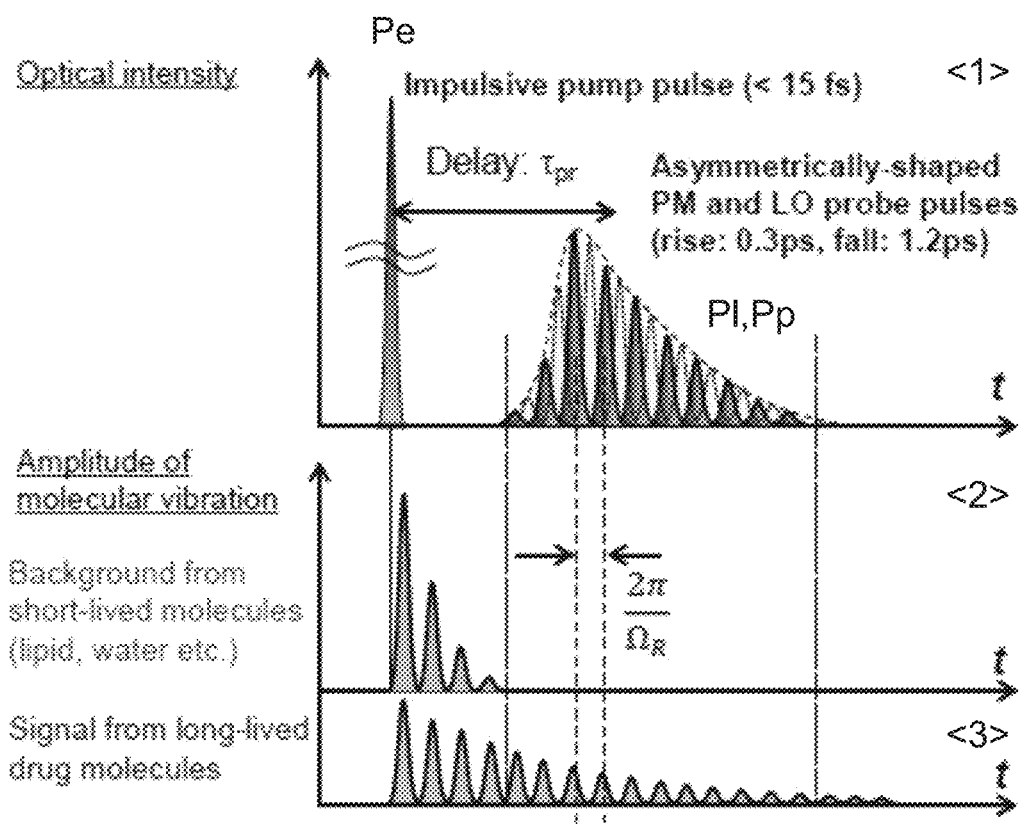

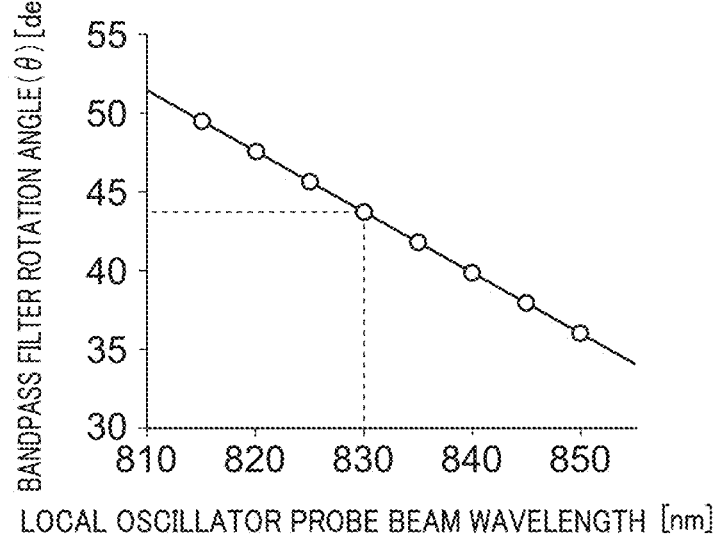
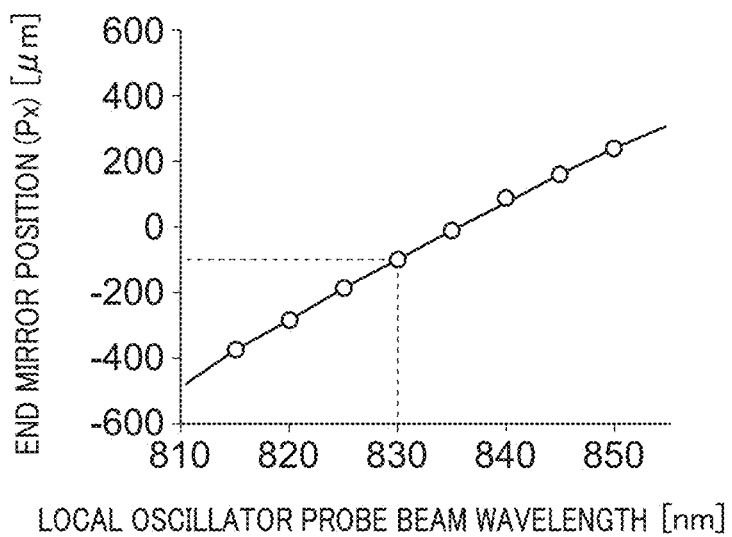

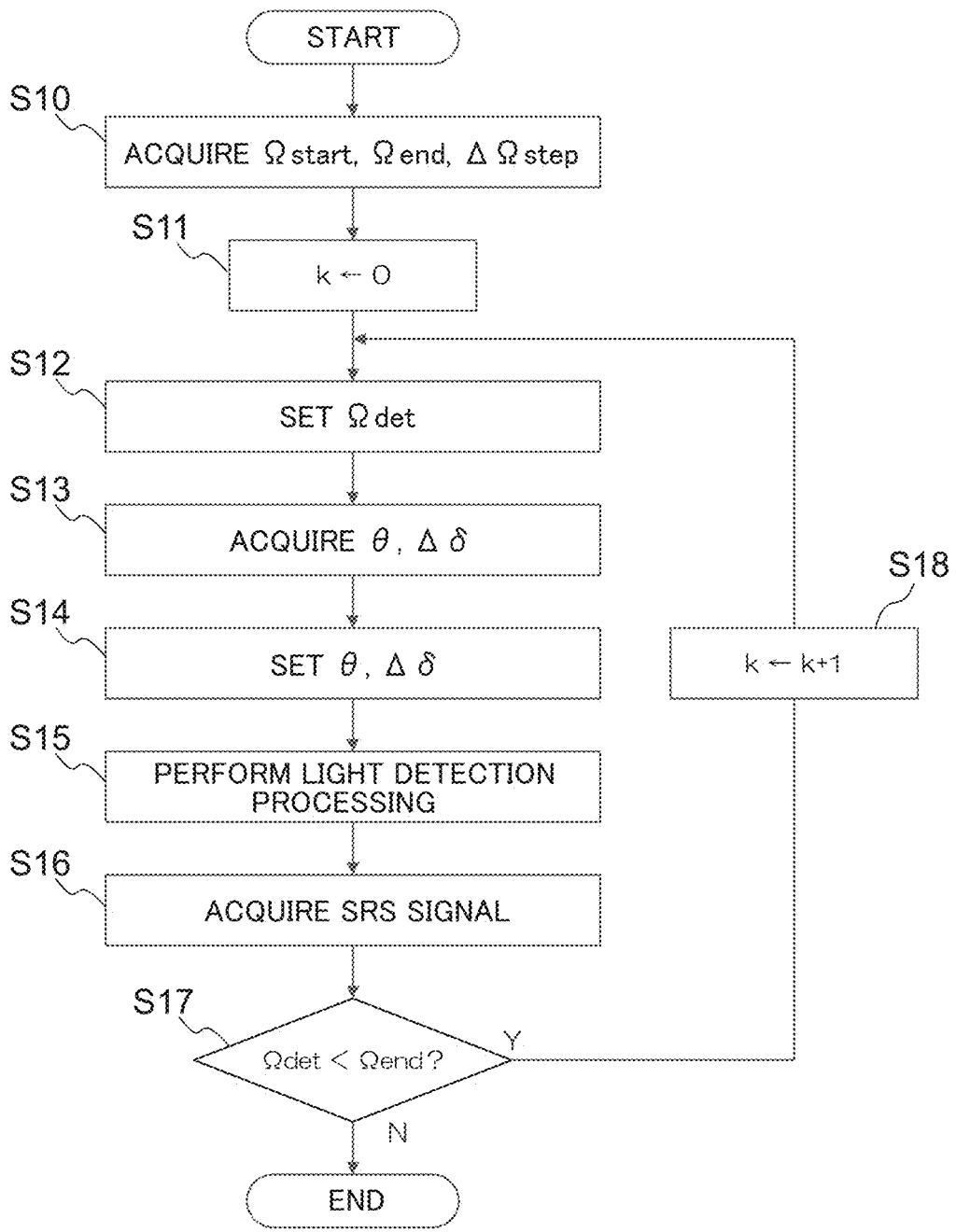

OPTICAL PULSE PAIR GENERATOR, LIGHT DETECTION DEVICE, AND LIGHT DETECTION METHOD

TECHNICAL FIELD

The present disclosure relates to an optical pulse pair generator, a light detection device, and a light detection method, and in particular relates to an optical pulse pair generator that generates an optical pulse pair having similar time waveforms, and to a light detection device and a light detection method that use the optical pulse pair generator to detect Raman scattering.

BACKGROUND ART

Coherent Raman scattering microscopes are known as imaging technology capable of imaging molecules present in cells or tissue without staining and at high speed. Coherent Raman scattering microscopes employ non-linear optical processes, such as coherent anti-Stokes Raman scattering (CARS) and stimulated Raman scattering (SRS). Coherent Raman scattering microscopes are devices that, based on signal levels reflecting molecular vibration information acquired by detecting Raman scattering created by interaction between light and molecules in such non-linear optical processes, are able to plot concentration distributions of chemical substances at a spatial resolution of the diffraction limit level of light (for example at 1 micrometer (μm) or finer). See, for example, "Coherent Raman Scattering Microscopy" edited by X. S. Xie and J X. Cheng, Taylor and Frances Books Inc., 2011.

A number of coherent Raman scattering microscopy methods are already known. These include time-resolved coherent Raman scattering microscopy that has attracted attention as a method that reduces background noise from cells and tissue themselves to enable the detection of signals of molecular vibrations at characteristic frequencies corresponding to small drug molecules at high contrast. See, for example, "Time-resolved coherent anti-Stokes Raman scattering microscopy: Imaging based on Raman free induction decay" by A. Volkmer, L. D. Book, and X. S. Xie, Applied Physics Letters Vol. 80: pp. 1505-1507 (2002).

There has also recently been a further method proposed that, as a development of a method for time-resolved coherent Raman scattering microscopy, employs spectral focusing to attain high spectral resolution. See, for example: "Chirped time-resolved CARS microscopy with square-pulse excitation" by P. K. Upputuri, L. Gong, and H. Wang in Optics Express Vol. 22, pp. 9611-9626 (2014); and "Single-beam phase-modulated stimulated Raman scattering microscopy with spectrally focused detection" by T. Ito, Y. Obara, and K. Misawa in Journal of the Optical Society of America B Vol. 34, pp. 1005-1017 (2017). A spectral focusing method is a method that realizes microscopy at high resolution by, for example, imparting the same group delay dispersion (linear chirp) to two femtosecond pulses, and selectively exciting, or probing, a Raman vibration peak corresponding to the frequency of the beat frequency thereof. See, for example, "Spectral focusing: High spectral resolution spectroscopy with broad-bandwidth laser pulses" by T. Hellerer, A. M. K. Enejder, and A. Zumbusch in Applied Physics Letters Vol. 85, pp. 25-27 (2004).

PRIOR ART LITERATURE

Non-Patent Documents

Non-Patent Document 1: "Coherent Raman Scattering Microscopy", edited by X. S. Xie and J X. Cheng in Taylor and Frances Books Inc., 2011

Non-Patent Document 2: "Time resolved anti-Stokes Raman scattering microscopy: Imaging based on Raman free induction decay" by A. Volkmer, L. D. Book, and X. S. Xie in Applied Physics Letters Vol. 80: pp. 1505-1507 (2002)

Non-Patent Document 3: "Chirped time-resolved CARS microscopy with square-pulse excitation" by P. K. Upputuri, L. Gong, and H. Wang in Optics Express Vol. 22, pp. 9611-9626 (2014)

Non-Patent Document 4: "Single-beam phase-modulated stimulated Raman scattering microscopy with spectrally focused detection" by T. Ito, Y. Obara, and K. Misawa in Journal of the Optical Society of America B Vol. 34, pp. 1004-1015 (2017)

Non-Patent Document 5: "Spectral focusing: High spectral resolution spectroscopy with broad-bandwidth laser pulses" by T. Hellerer, A. M. K. Enejder, and A. Zumbusch, in Applied Physics Letters Vol. 35, pp. 25-27

SUMMARY OF INVENTION

Technical Problem

Time-resolved coherent Raman microscopy employs an excitation pulse to excite a molecular vibration and a probe beam to detect such a vibration. The probe beam is time-delayed with respect to the excitation pulse. However, when a conventional time-resolved coherent Raman microscope is simply combined with spectral focusing methods to configure a light detection device, although spectral resolution is improved, the level of nonresonant background light, called background noise, also increases, and so a drop in molecular detection performance occurs.

This increase in background noise is due to an overlap occurring between one pulse beam spread out for spectral focusing with other temporally separate pulse. Namely, when spread out over time, the excitation pulse overlaps with the probe beam, and there is a relationship between the spreading out of the probe pulse and the overlap with the excitation pulse. Although background noise can be suppressed by increasing the time delay, an issue arises in that the detection sensitivity decreases as the probe delay is increased due to molecular vibration coherence attenuating with a time-constant of around 1 picosecond (ps). Namely, there is a mutual tradeoff relationship between wavenumber resolution, background noise level suppression performance, and detection sensitivity, making it difficult to improve performance in all of these areas.

The use of time-asymmetric pulse beams might be considered as a way to avoid such background noise by suppressing overlap of the excitation pulse and probe pulse. Namely, for example, the use of a time waveform that has a sharp rise and a gentle attenuation might be considered to enable a vibration immediately following excitation to be captured while avoiding background noise arising from superimposed pulses. A light spectrum with a high order dispersion, namely a spectral phase profile with a steep curve, is needed to generate time-asymmetric pulse. However, there is a limitation to the pixel resolution and the phase modulation dynamic range in conventional waveform shapers such as liquid crystal spatial light modulators and the like, meaning that such steep phase changes are generally difficult to reproduce. As a result, even with a waveform shaper configured by conventional technology for example, noise caused by side lobes in the pulse beam waveform after waveform shaping is generated as a result of imperfect phase control, giving rise to the issue that molecule detection performance is limited as a result. Moreover, since two pulse beams are required in order to satisfy predetermined conditions in spectral focusing, there is demand for a simple precision generation method for such pulse pairs.

In consideration of the above circumstances, the present disclosure provides a pulse pair generator capable of generating time-asymmetric pulse pairs having similar profiles and different central frequencies to each other using a simple configuration, and a light detection device and light detection method employing the pulse pair generator to achieve both high frequency resolution and high sensitivity.

Solution to Problem

An optical pulse pair generator according to a first aspect of the present disclosure is configured to generate an optical pulse pair including a first pulse beam and a second pulse beam having respective central wavelengths that are separated by a predetermined wavelength difference from each other and having target time waveforms that are substantially the same as each other. The optical pulse pair generator includes a splitter section configured to split an incident pulse beam into two, a first shaping section configured to shape one of the pulse beams split by the splitter section by shaping into the target time waveform and setting a central frequency so as to configure the first pulse beam, and a second shaping section configured to shape the other of the pulse beams split by the splitter section by shaping into the target time waveform so as to configure the second pulse beam.

A second aspect of the present disclosure is the first aspect, wherein the first shaping section includes a first bandpass filter having a bandwidth corresponding to the target time waveform of the one pulse beam and rotatable in a direction intersecting a propagation direction of the one pulse beam, and further includes a delay member configured to impart a variable time delay to the one pulse beam, and the second shaping section includes a second bandpass filter having a bandwidth corresponding to the target time waveform of the other pulse beam.

A third aspect of the present disclosure is the second aspect, wherein a wavelength scanning section for scanning the wavelength difference is configured by the first bandpass filter and the delay member, the first pulse beam and the second pulse beam are temporally superimposed on each other, and the wavelength scanning section sets the wavelength difference by using a rotation angle of the first bandpass filter, and compensates a time difference between the first pulse beam and the second pulse beam accompanying rotation of the first bandpass filter by using the time delay of the delay member.

A fourth aspect of the present disclosure is either the second aspect or the third aspect, wherein the splitter section is configured by the second bandpass filter.

A fifth aspect of the present disclosure is any one of the first aspect to the fourth aspect, wherein the first pulse beam and the second pulse beam both have an asymmetric waveform with a fall time that is longer than a rise time, and are temporally superimposed on each other.

A light detection device according to a sixth aspect of the present disclosure includes the optical pulse pair generator of any one of the first aspect to the fifth aspect and is configured to perform light detection using an excitation pulse beam, a first probe pulse beam, and a second probe pulse beam, wherein the first pulse beam configures the first probe pulse beam. The light detection device further includes a laser light source configured to generate a light source pulse beam, a light source splitter section configured to split the light source pulse beam in two by splitting into the excitation pulse beam and the incident pulse beam, a modulation section configured to phase modulate the second pulse beam so as to configure the second probe pulse beam, a multiplexing section configured to multiplex the excitation pulse beam, the first probe pulse beam, and the second probe pulse beam so as to generate a multiplexed beam, an illumination section configured to illuminate a sample with the multiplexed beam, and a detection section configured to employ heterodyne interference due to the first probe pulse beam and the second probe pulse beam to detect a molecular vibration excited by the excitation pulse beam when the multiplexed beam is illuminating the sample.

A seventh aspect of the present disclosure is the sixth aspect, wherein the first probe pulse beam and the second probe pulse beam both have an asymmetric waveform with a fall time that is longer than a rise time, are temporally superimposed on each other, and are delayed by a predetermined delay time relative to the excitation pulse beam.

An eighth aspect of the present disclosure is either the sixth aspect or the seventh aspect, wherein the excitation pulse beam is polarized in advance, a wavelength of the first probe pulse beam and a wavelength of the second probe pulse beam are different from each other, the illumination section is includes a microscope, and the detection section includes a polarizer configured to remove the excitation pulse beam from the multiplexed beam after the sample has been illuminated, an optical filter configured to remove the second probe pulse beam from the multiplexed beam after the sample has been illuminated, and a light reception section configured to receive the first probe pulse beam.

A ninth aspect of the present disclosure is the eighth aspect, wherein the first shaping section includes a wavelength scanning section configured to scan the wavelength difference, the wavelength scanning section including a first bandpass filter having a bandwidth corresponding to the target time waveform of the one pulse beam and rotatable in a direction intersecting a propagation direction of the first pulse beam, and further including a delay member configured to impart a variable time delay to the one pulse beam, and the light detection device further includes a control section configured to control the wavelength scanning section so as to set the wavelength difference by using a rotation angle of the first bandpass filter and to compensate a time difference between the first probe pulse beam and the second probe pulse beam accompanying rotation of the first bandpass filter by using the time delay of the delay member, and further configured to control the modulation section so as to perform phase modulation with a modulation signal having a saw-tooth waveform including regions of linear change in phase for the second probe pulse beam transmitted through a second bandpass filter having a bandwidth corresponding to the target time waveform and including connection regions at which there is a steep change of phase difference $2\pi$.

A tenth aspect of the present disclosure is the ninth aspect, wherein the control section is configured to accept a received light signal output from the light reception section, to configure a lock-in amplifier using the received light signal and the modulation signal, and to detect an amplitude-modulated signal from modulating the first probe pulse beam resulting from heterodyne interference due to the lock-in amplifier as a signal corresponding to a stimulated Raman scattering signal.

An eleventh aspect of the present disclosure is the tenth aspect, wherein the first bandpass filter applies a predetermined odd-number high order dispersion to the first probe pulse beam, and the second bandpass filter applies the predetermined odd-number high order dispersion to the second probe pulse beam.

A light detection method according to a twelfth aspect of the present disclosure is a method of detecting light of a molecular vibration using a light detection device including a laser light source configured to generate a light source pulse beam, a splitter section configured to split the light source pulse beam into three by splitting into an excitation pulse beam, and a first probe pulse beam and a second probe pulse beam that both have a predetermined waveform, a first shaping section configured to shape the first probe pulse beam by shaping into the predetermined waveform and setting a central frequency, a second shaping section configured to shape the second probe pulse beam by shaping into the predetermined waveform, a modulation section configured to phase modulate the second probe pulse beam, a multiplexing section configured to multiplex the excitation pulse beam, the first probe pulse beam, and the second probe pulse beam so as to generate a multiplexed beam, and an illumination section configured to illuminate a sample with the multiplexed beam. The light detection method includes setting a difference between a central wavelength of the first probe pulse beam and a central wavelength of the second probe pulse beam so as to be separated by a wavelength difference corresponding to a frequency of the molecular vibration, setting the predetermined waveforms so as to be substantially the same asymmetric waveforms having a fall time that is longer than a rise time, temporally superimposing the first probe pulse beam and the second probe pulse beam and delaying the first probe pulse beam and the second probe pulse beam relative to the excitation pulse beam by a predetermined delay time, and by a detection section, detecting a molecular vibration excited by the excitation pulse beam when the multiplexed beam is illuminating the sample by employing heterodyne interference due to the first probe pulse beam and the second probe pulse beam.

Advantageous Effects of Invention

The present disclosure is capable of providing a pulse pair generator capable of generating time-asymmetric pulse pairs having similar profiles and different central frequencies to each other using a simple configuration, and a light detection device and light detection method employing the pulse pair generator to achieve both high frequency resolution and high sensitivity.

BRIEF DESCRIPTION OF DRAWINGS

FIG. 3A is a diagram illustrating characteristics with respect to a time axis of pulse beams in a light detection device according to an exemplary embodiment.

FIG. 4A is a diagram to explain adjustment of a local oscillator probe pulse of a light detection device according to an exemplary embodiment.

FIG. 4B is a diagram to explain adjustment of a local oscillator probe pulse of a light detection device according to an exemplary embodiment.

FIG. 5 is a flowchart illustrating a flow of a light detection processing program according to an exemplary embodiment.

DESCRIPTION OF EMBODIMENTS

Detailed explanation follows regarding an exemplary embodiment of the present disclosure, with reference to the drawings. In the following exemplary embodiment, explanation is given regarding an example of an embodiment in which a light detection device according to the present disclosure is applied to a phase-modulated stimulated Raman scattering microscope that employs a stimulated Raman scattering (SRS) process.

Figure 1:
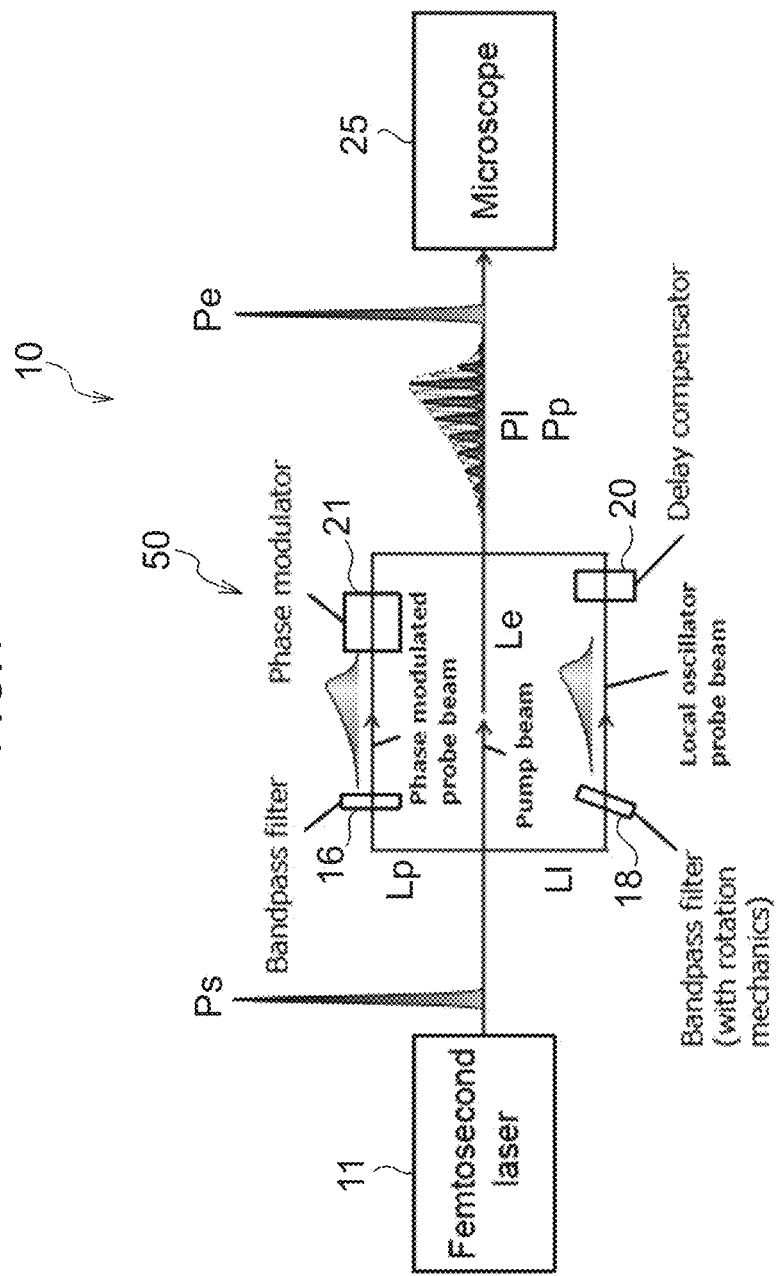
FIG. 1 is a schematic configuration diagram to explain configuration of a light detection device according to an exemplary embodiment.

Explanation follows regarding an optical pulse pair generator, a light detection device, and a light detection method according to the present exemplary embodiment, with reference to FIG. 1 to FIG. 7. First, explanation follows regarding basic configuration of a light detection device 10 according to the present exemplary embodiment, with reference to FIG. 1. As illustrated in FIG. 1, the light detection device 10 is configured including a light source 11, a pulse beam generation section 50, and a microscope 25.

The light source 11 is a laser light source that generates an excitation beam and probe beam in order to generate an SRS signal. The present exemplary embodiment employs a pulse excitation beam (excitation pulse beam) and pulse probe beams (probe pulse beams). The light source 11 generates a light source pulse beam Ps that is the basis of these pulse beams. In the present exemplary embodiment, a femtosecond pulse is employed as the light source pulse beam Ps. Moreover, in the present exemplary embodiment two probe beams, namely a local oscillator probe beam and a phase modulated probe beam, are employed as the probe beams. The microscope 25 is at the location where a sample is illuminated with the excitation beam and the probe beams, and is connected at a later stage to a light reception section 43 and a control section 44, described later.

The pulse beam generation section 50 employs the light source pulse beam Ps to generate an excitation pulse beam Pe and two probe pulse beams, namely the local oscillator probe pulse beam Pl and the phase modulated probe pulse beam Pp. Accordingly, the laser beam from the light source 11 is split into three by splitting into an excitation beam Le, a local oscillator probe beam Ll, and a phase modulated probe beam Lp. The light source pulse beam Ps in the present exemplary embodiment and the excitation pulse beam Pe thereof are ultrashort pulse beams. The local oscillator probe pulse beam Pl and the phase modulated probe pulse beam Pp have asymmetric waveforms with a rapid rise and slow fall, and are arranged so as to be delayed by a predetermined time interval from the excitation pulse beam Pe. In the present exemplary embodiment, the local oscillator probe pulse beam Pl and the phase modulated probe pulse beam Pp have substantially the same waveforms (similar waveforms to each other) but different central wavelengths to each other, and are also superimposed on each other timewise. In the following explanation, the local oscillator probe beam Ll and the phase modulated probe beam Lp are referred to collectively as the "probe beams", and the local oscillator probe pulse beam Pl and the phase modulated probe pulse beam Pp are referred to collectively as the "probe pulse beams".

As illustrated in FIG. 1, a bandpass filter 18 for waveform shaping and an end mirror 20 are disposed on the optical path of the local oscillator probe beam Ll. A bandpass filter 16 for waveform shaping is disposed on the optical path of the phase modulated probe beam Lp together with an optical modulator 21. Details regarding the waveform adjustment methods in the local oscillator probe pulse beam Pl and the phase modulated probe pulse beam Pp will be described in detail later. Note that the placement of the excitation pulse beam Pe, the local oscillator probe pulse beam Pl, and the phase modulated probe pulse beam Pp illustrated in FIG. 1 schematically illustrates a snapshot of light when viewed along a spatial axis from above.

Figure 2:
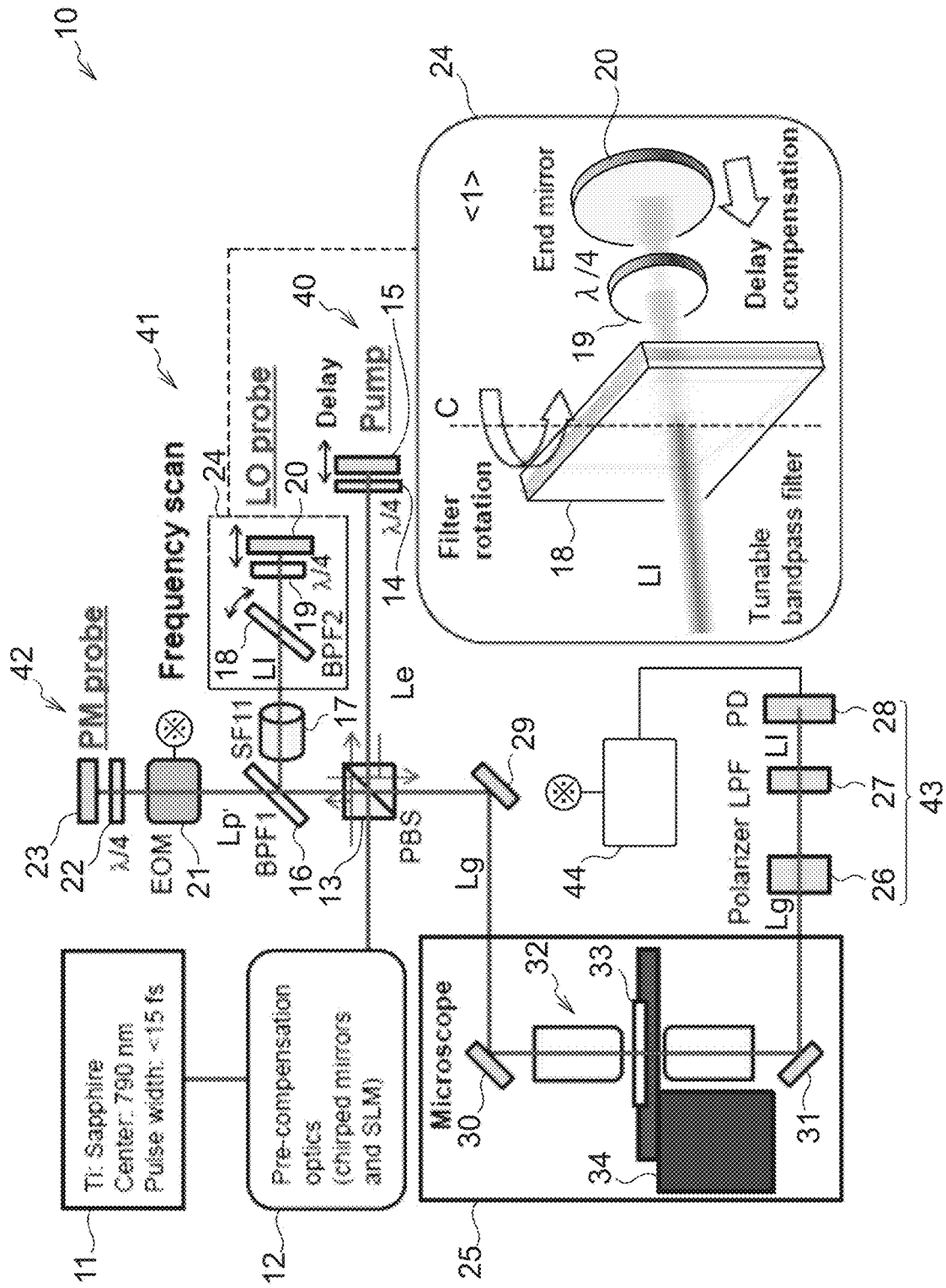
FIG. 2 is a block diagram illustrating an example of configuration of a light detection device according to an exemplary embodiment.

Detailed explanation next follows regarding an example of configuration of the light detection device 10 according to the present exemplary embodiment, with reference to FIG. 2. As illustrated in FIG. 2, the light detection device 10 is configured including the light source 11, a waveform shaping section 12, a polarizing beam splitter (PBS) 13, an excitation pulse beam adjustment section 40, a local oscillator probe pulse beam adjustment section 41, a phase modulated probe pulse beam adjustment section 42, the microscope 25, the light reception section 43, and the control section 44.

The light source 11 is a light source that, through a Raman scattering process in the light detection device 10, generates beams corresponding to each of the excitation beam Le (excitation pulse beam Pe), the local oscillator probe beam Ll (local oscillator probe pulse beam Pl), and the phase modulated probe beam Lp (phase modulated probe pulse beam Pp). The optical path of the excitation beam Le illustrated in FIG. 2 is a path from the light source 11→the PBS 13→a ¼ wavelength plate 14→an end mirror 15→the ¼ wavelength plate 14→the PBS 13→a mirror 29. The optical path of the local oscillator probe beam Ll is a path from the light source 11→the PBS 13→the bandpass filter 16→a glass rod 17→the bandpass filter 18→a ¼ wavelength plate 19→the end mirror 20→the ¼ wavelength plate 19→the bandpass filter 18→the glass rod 17→the bandpass filter 16→the PBS 13→the mirror 29. The optical path of the phase modulated probe beam Lp is a path from the light source 11→the PBS 13→the bandpass filter 16→the optical modulator 21→a ¼ wavelength plate 22→an end mirror 23→the ¼ wavelength plate 22→the bandpass filter 16→the PBS 13→the mirror 29. Namely, in the present exemplary embodiment, the excitation beam Le and the probe beams (the local oscillator probe beam Ll and the phase modulated probe beam Lp) are split by the PBS 13, and the local oscillator probe beam Ll and the phase modulated probe beam Lp are split by the bandpass filter 16.

In the light detection device 10 of the present exemplary embodiment, an ultrashort pulse laser is employed in the light source 11 to generate the light source pulse beam Ps with a broad waveband. As an example, an infrared broadband femtosecond laser is employed as the light source 11 of the present exemplary embodiment. More specifically, as illustrated in FIG. 2, a titanium sapphire laser with a central wavelength of 790 nm and a pulse width of 15 femtoseconds (fs) is, as an example, employed as the light source 11. Note that the wavelength and pulse width of the light source 11 are not limited thereto, and may be set to appropriate values according to the design specification and the like of the light detection device 10. Note that in the present exemplary embodiment, the light source pulse beam Ps emitted from the light source 11 is linear polarized light polarized in a predetermined direction. However, the way in which the light source pulse beam Ps is polarized is not limited thereto, and for example the pulse beam may be circular polarized or elliptical polarized.

The waveform shaping section 12 is a location where the light source pulse beam Ps is compensated so as to satisfy desired characteristics. Namely, although not illustrated in the drawings, the waveform shaping section 12 is configured including a dispersion compensating optical element, a spatial light modulator (SLM), and the like, and the pulse width of an illuminated beam below an object lens 32, described later, is appropriately dispersion-compensated such that a minimum value of the light source 11 is 15 fs. Note that in the present exemplary embodiment, a chirped mirror is employed as an example of the dispersion compensating optical element to give high reflectivity using a dielectric multilayer film and to impart negative second order dispersion compensation, and a liquid crystal spatial light modulator is employed as an example of the SLM.

The PBS 13 is an optical element to split the laser beam generated by the light source 11 into two by splitting into the excitation beam Le and the probe beams (the local oscillator probe beam Ll and the phase modulated probe beam Lp).

The excitation pulse beam adjustment section 40 includes the ¼ wavelength plate 14 and the end mirror 15. The ¼ wavelength plate 14 initially converts the excitation beam Le into circular-polarized light, which is then reflected by the end mirror 15 such that the polarization direction after reflection is changed to a direction different to the polarization direction of the light source pulse beam Ps so as to be reflected by the PBS 13. The end mirror 15 is movable along the optical axis direction of the light excitation beam Le to adjust a delay time imparted to the excitation pulse beam Pe so as to set a time difference between the probe pulse beams.

The local oscillator probe pulse beam adjustment section 41 includes the glass rod 17 and a wavelength scanning section 24. The wavelength scanning section 24 is configured including the bandpass filter 18, the ¼ wavelength plate 19, and the end mirror 20. The functionality of the ¼ wavelength plate 19 is similar to that of the ¼ wavelength plate 14. The glass rod 17 is an optical element that imparts the local oscillator probe pulse beam Pl with a dispersion corresponding to the dispersion of the optical modulator 21, described later. The glass rod 17 is not an essential component, and is not required in cases in which there would not be a problem were there to be a difference between the dispersion imparted to the local oscillator probe pulse beam Pl caused by the optical modulator 21 and the dispersion imparted to the phase modulated probe pulse beam Pp.

Box <1> in FIG. 2 illustrates details of the wavelength scanning section 24. As illustrated in box <1> in FIG. 2, the bandpass filter 18 is capable of rotating about a predetermined rotation axis C, and is a tunable filter for setting the central frequency of the local oscillator probe pulse beam Pl. The end mirror 20 primarily compensates for movements in the delay of the local oscillator probe pulse beam Pl accompanying rotation of the bandpass filter 18. The wavelength scanning section 24 is connected to the control section 44, described later, and the bandpass filter 18 and the end mirror 20 are controlled by the control section 44. Details regarding control of the bandpass filter 18 and the end mirror 20 for setting the central wavelength and adjusting the delay of the local oscillator probe pulse beam Pl will be described later.

The phase modulated probe pulse beam adjustment section 42 is configured including the optical modulator 21, the ¼ wavelength plate 22, and the end mirror 23. The optical modulator 21 is a phase modulator for phase modulating the phase modulated probe beam Lp, and as an example in the present exemplary embodiment, an electro-optic modulator (EOM) is employed therefor. The optical modulator 21 is connected to a non-illustrated drive circuit, and this drive circuit is connected to the control section 44. As an example, the optical modulator 21 imparts a phase modulation to the phase modulated probe beam Lp using a 65 kHz saw-tooth waveform. The saw-tooth waveform in this case is preferably a waveform including regions of linear change in phase for the phase modulated probe beam Lp and connection regions of sharp change of phase difference $2\pi$. The functionality of the ¼ wavelength plate 22 is similar to that of the ¼ wavelength plate 14. The end mirror 23 adjusts the relationship of temporal arrangement between the local oscillator probe pulse beam Pl and the phase modulated probe pulse beam Pp. Note that although in the present exemplary embodiment an example is described in which delays are adjusted using the end mirrors 15, 20, and 23, there is no limitation thereto, and other optical elements that are mechanisms capable of varying optical delay, such as optical delay lines, may be employed therefor.

Detailed explanation follows regarding the bandpass filters 16, 18 according to the present exemplary embodiment. In the present exemplary embodiment, variable bandpass filters with the same bandwidth are employed as the bandpass filters 16, 18. The design central frequencies of the bandpass filters may differ from each other. Generally, as the rotation angle of the bandpass filter increases, the central wavelength of the transmitted light will shift toward the high frequency side (short wavelength side). Moreover, the respective probe beams are applied with strong nonlinear chirps as they pass through the bandpass filters twice, when passing through on the outward and return journeys. When this occurs, the nonlinear chirps preferably include a third order dispersion or a greater odd-number order (e.g. fifth order or seventh order) dispersion. The nonlinear chirps are conditions to achieve an asymmetric time waveform of the probe pulse beam. Although in the present exemplary embodiment an example is described in which the bandpass filters 16, 18 are each configured as a single filter, there is no limitation thereto, and plural bandpass filters may be combined so as to function as a single bandpass filter.

Note that many dielectric multilayer film bandpass filters are designed based on Fabry-Pérot oscillators. and it is known that such bandpass filters have an odd-number order dispersion. Accordingly, dielectric multilayer film bandpass filters may be utilized as elements to shape the time waveforms of pulses. Note that the bandpass filters 16, 18 used in the present exemplary embodiment are preferably designed such that the profile of the spectrum (spectral profile of the transmitted wavelength band) does not change when the beam incident angle changes, namely when rotated. Moreover, the bandpass filters 16, 18 are preferably designed such that their transmittance characteristics are not dependent on the incident polarization.

In order to arrange the time waveforms of the local oscillator probe pulse beam Pl and the phase modulated probe pulse beam Pp more densely, preferably the linear chirp components (second order dispersions) thereof are also designed so as to be substantially the same as each other. Accordingly, as described above, the glass rod 17 with the same second order dispersion as the second order dispersion of the optical modulator 21 employed to perform phase modulation is disposed in the local oscillator probe pulse beam adjustment section 41.

Note that the optical pulse pair generator according to the present exemplary embodiment is configured including the light source 11, the bandpass filters 16, 18, and the end mirrors 20, 23. A first pulse beam (the local oscillator probe pulse beam Pl) reflected by the end mirror 20 and a second pulse beam (the phase modulated probe pulse beam Pp) reflected by the end mirror 23 are multiplexed by the bandpass filter 16 to configure the optical pulse pair according to the present exemplary embodiment. The optical pulse pair generator of the present exemplary embodiment is a device to generate pulse pairs each having substantially the same (mutually similar) time waveforms. The light detection device according to the present exemplary embodiment employs the pulse pairs with asymmetric time waveforms generated by the optical pulse pair generator to enable coherent Raman spectroscopy to be implemented that achieves both a high frequency resolution and a high sensitivity, while avoiding background noise.

Moreover, the bandpass filters 16, 18 are employed not only as wavelength selection elements but are also employed as waveform shaping elements to generate the asymmetric pulses. Combining rotation of the bandpass filter 18 with a compensation mechanism for optical delay accompanying this rotation, enables the central frequency to be shifted alone without changing the time waveform. The compensation mechanism for optical delay will be described in detail later.

Re-referencing FIG. 2, the excitation beam Le, the local oscillator probe beam Ll, and the phase modulated probe beam Lp described above are changed in direction at the mirror 29 and then multiplexed in a coaxial state to form a multiplexed beam Lg to be introduced into the microscope 25. When this is performed, the relative delay time between the excitation pulse beam Pe and the probe pulse beams is adjustable using the optical axis direction position of the end mirror 20 of the excitation pulse beam adjustment section 40.

The microscope 25 is an optical microscope configured including the object lens 32, a stage 34, and mirrors 30, 31 for changing the beam direction. A sample 33 is mounted on the stage 34, and the multiplexed beam Lg incident through the object lens 32 is illuminated onto the sample 33. The sample 33 is, for example, biological cells impregnated with a drug. When the multiplexed beam Lg is illuminated onto the sample 33, an SRS signal is, for example, generated by a molecular vibration of the drug molecule based on an SRS process, for example.

The light reception section 43 is configured including a polarizer 26, a long pass filter 27, and a photodetector 28.

The polarizer 26 has a polarizing axis in a direction different to the polarization direction of the excitation beam Le (for example a direction orthogonal thereto), and removes the excitation beam Le from the multiplexed beam Lg. The long pass filter 27 is a filter that removes the phase modulated probe beam Lp from the multiplexed beam Lg containing the local oscillator probe beam Ll and the phase modulated probe beam Lp but from which the excitation beam Le has been removed. In the present exemplary embodiment, the wavelength of the local oscillator probe beam Ll is set so as to be longer than the wavelength of the phase modulated probe beam Lp. The photodetector 28 receives the local oscillator probe beam Ll and converts the local oscillator probe beam Ll into an electrical signal. A photodiode is, for example, employed as the photodetector 28. The photodetector 28 is connected to the control section 44, and the light reception signal of the photodetector 28 is sent to the control section 44. Note that the long pass filter 27 is employed in the present exemplary embodiment in order to set the wavelength of the local oscillator probe beam Ll longer than the wavelength of the phase modulated probe beam Lp. Since there is no particular limitation to a relationship between the wavelength of the local oscillator probe beam Ll and the wavelength of the phase modulated probe beam Lp, a short pass filter may be employed instead of the long pass filter 27 in cases in which the wavelength of the local oscillator probe beam Ll is set shorter than the wavelength of the phase modulated probe beam Lp.

Namely, from out of the laser pulses of the excitation pulse beam Pe, the local oscillator probe pulse beam Pl, and the phase modulated probe pulse beam Pp after passing through the microscope 25, the excitation pulse beam Pe is blocked by the polarizer 26 and the phase modulated probe pulse beam Pp is blocked by the long pass filter 27. Only the local oscillator probe pulse beam Pl passes through as far as the photodetector 28. The light intensity of the local oscillator probe pulse beam Pl is converted into an electric current in the photodetector, and the light intensity modulation component superimposed on the local oscillator probe pulse beam Pl is detected by a lock-in amplifier. The light intensity modulation component detected by the lock-in amplifier is a signal component originating from Raman scattering in the sample 33 (referred to hereafter as an SRS signal). The SRS signal is a signal proportional to the sample concentration (the drug concentration in the present exemplary embodiment). Note that although FIG. 2 illustrates an example in which the polarizer 26 and the long pass filter 27 are disposed in that sequence, they may be disposed in the reverse sequence.

The control section 44 is a location for performing photo detection signal processing to extract frequency components of SRS light from the local oscillator probe beam Ll from the sample 33 containing the SRS light generated. Although not illustrated in the drawings, the control section 44 includes a central processing unit (CPU), read only memory (ROM), random access memory (RAM), and the like.

The control section 44 is connected to the drive circuit (including a signal generator, not illustrated in the drawings) of the optical modulator 21, the photodetector 28, and the wavelength scanning section 24. Sometimes a signal generator and a high voltage amplifier are also provided either inside the control section 44 or externally attached, for generating an electrical signal to perform phase modulation by changing a drive voltage of the optical modulator 21. The control section 44 in such cases controls the signal generator and perform waveform control of the drive voltage etc. in order implement the phase modulation of the optical modulator 21. The control section 44 may be configured by a general purpose personal computer or the like. The control section 44 drives the optical modulator 21 through the drive circuit, and also configures a lock-in amplifier that receives an amplitude-modulated signal from the photodetector 28, and extracts the SRS signal from the local oscillator probe pulse beam Pl that has been amplitude-modulated by heterodyne interference.

The wavelength scanning section 24 is also connected to the control section 44, and the control section 44 controls rotation of the bandpass filter 18 included in the wavelength scanning section 24, and also controls movement of the end mirror 20.

As described above, the light detection device and the light detection method according to the present exemplary embodiment convert a physical response (momentary changes in refractive index) generated by molecular vibrations excited by the excitation beam Le into an intensity modulation of the time-delayed probe beams, and detect a light intensity modulation component synchronized to a modulation frequency using a demodulator such as a lock-in amplifier.

Figure 3B:
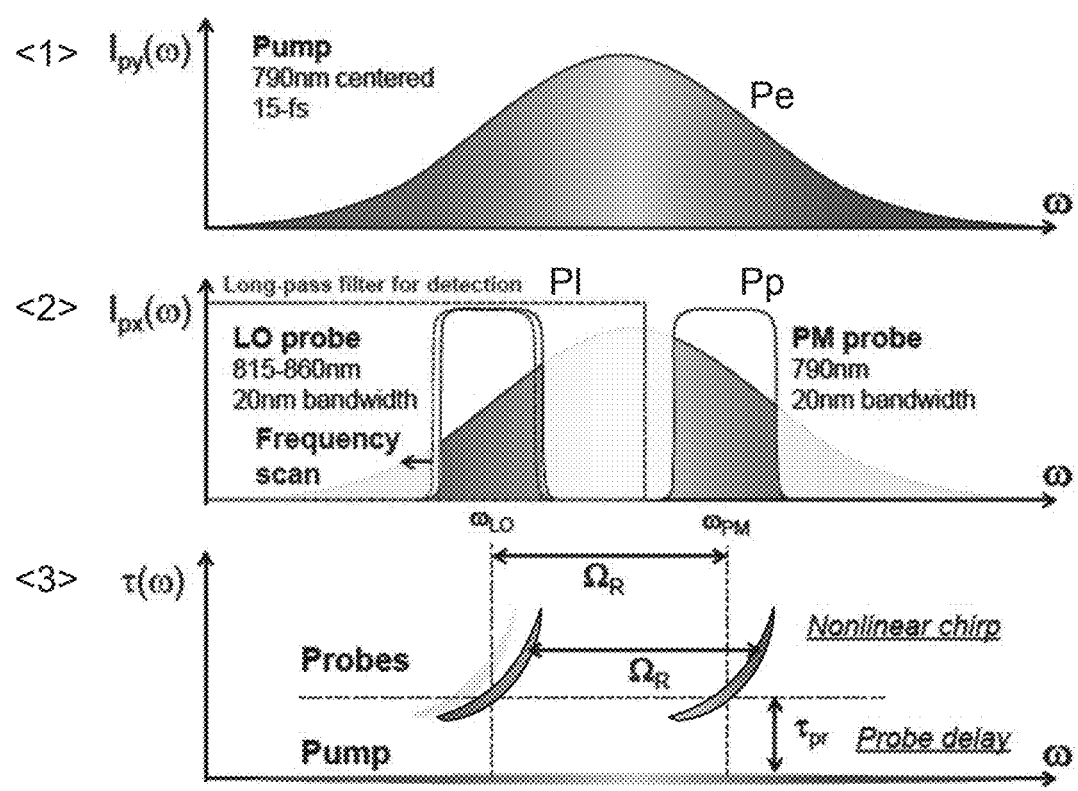
FIG. 3B is a diagram illustrating characteristics with respect to a frequency axis of pulse beams in a light detection device according to an exemplary embodiment.

Next, explanation follows regarding principles of the light detection device and the light detection method according to the present exemplary embodiment, with reference to FIGS. 3A and 3B. FIG. 3A illustrates a relationship between pulse time waveforms and an amplitude of a molecular vibration. <1> in FIG. 3A illustrates a temporal relationship of the excitation pulse beam Pe to the local oscillator probe pulse beam Pl and the phase modulated probe pulse beam Pp. As illustrated in <1> in FIG. 3A, the local oscillator probe pulse beam Pl and the phase modulated probe pulse beam Pp are temporally overlapped, and lag behind the excitation pulse beam Pe by a delay time $\tau_{pr}$. Namely, in the present exemplary embodiment, plural molecular vibrations are excited by the excitation beam Le of short pulse width, and two probe beams are employed for heterodyne detection of such vibrations. Note that as an example in the present exemplary embodiment, the delay time $\tau_{pr}$ is set to 0.9 ps. However, the delay time $\tau_{pr}$ is not limited to 0.9 ps, and may be set as appropriate according to the detection subject and the like.

Note that for the local oscillator probe pulse beam Pl and the phase modulated probe pulse beam Pp illustrated in <1> of FIG. 3A, the respective enveloping lines (envelopes) thereof indicate the local oscillator probe pulse beam Pl and the phase modulated probe pulse beam Pp. The illustrated pulse shaped waveform inside the envelope is a conceptual representation of the beat signal arising due to a frequency difference $\Omega_R$ between the local oscillator probe pulse beam Pl and the phase modulated probe pulse beam Pp. As illustrated in <1> of FIG. 3A, time-asymmetric waveforms are employed in the present exemplary embodiment for the local oscillator probe pulse beam Pl and the phase modulated probe pulse beam Pp, with, for example, a rise time of the local oscillator probe pulse beam Pl and the phase modulated probe pulse beam Pp of 0.3 ps and a fall time thereof of 1.2 ps.

<2> and <3> of FIG. 3A illustrate amplitudes of respective molecular vibrations. <2> of FIG. 3A illustrates a background molecular vibration, and <3> of FIG. 3A illustrates a molecular vibration of the sample (the drug employed as an example in the present exemplary embodiment). As illustrated in <3> of FIG. 3A, the vibration of the sample is a vibration with a comparatively long life, starting at the position of the excitation pulse beam Pe and continuing almost until the position of the end of the probe pulse beam. By contrast, the background molecular vibration as illustrated in <2> of FIG. 3A is a vibration with a shorter life in comparison to the molecular vibration of the sample, and has almost vanished by a position in the vicinity of the rise position of the probe pulse beam. In other words, the delay time $\tau_{pr}$ between the excitation pulse beam Pe and the probe pulse beam is set such that the probe pulse beam rises around the time that the background molecular vibration fades.

Next, explanation follows regarding frequency (wavelength) characteristics of the excitation pulse beam Pe, the local oscillator probe pulse beam Pl, and the phase modulated probe pulse beam Pp, with reference to FIG. 3B. <1> of FIG. 3B illustrates light output frequency characteristics of the excitation pulse beam Pe, <2> of FIG. 3B illustrates light output frequency characteristics of the local oscillator probe pulse beam Pl and the phase modulated probe pulse beam Pp, and <3> of FIG. 3B illustrates group delay frequency characteristics of the local oscillator probe pulse beam Pl and the phase modulated probe pulse beam Pp. Note that <1> to <3> of FIG. 3B employ matching scales on the horizontal axis (angular frequency ω).

As illustrated in FIG.<1> of FIG. 3B, an ultrashort pulse beam is employed as the excitation pulse beam Pe in the present exemplary embodiment, and so the excitation pulse beam Pe has a broad bandwidth. As described above, for the excitation pulse beam Pe the central wavelength is approximately 790 nm and the pulse width is approximately 15 fs.

In contrast thereto, part of the band characteristics of the excitation pulse beam Pe are cut by the bandpass filter 18 for the local oscillator probe pulse beam Pl and the bandpass filter 16 for the phase modulated probe pulse beam Pp. This means that the light output frequency characteristics of the local oscillator probe pulse beam Pl and the phase modulated probe pulse beam Pp are band-limited as illustrated in <2> of FIG. 3B. The central wavelength of the local oscillator probe pulse beam Pl according to the present exemplary embodiment is, as an example, from 815 nm to 860 nm, and the bandwidth thereof is approximately 20 nm. The central wavelength of the phase modulated probe pulse beam Pp is, as an example, approximately 790 nm, and the bandwidth thereof is approximately 20 nm. The central wavelength of the phase modulated probe pulse beam Pp is, as an example, approximately 790 nm, and the bandwidth thereof is approximately 20 nm. Namely, in the present exemplary embodiment, the bandwidth of the local oscillator probe pulse beam Pl and the bandwidth of the phase modulated probe pulse beam Pp are set so as to be substantially equal to one another. Note that the difference in the distance from the central wavelength of 790 nm of the phase modulated probe pulse beam Pp to the central wavelength range of the local oscillator probe pulse beam Pl, which varies from 815 nm to 860 nm, gives the wavelength scan range, and corresponds to a detection range for molecular vibration of the sample. In other words, in the light detection device 10 according to the present exemplary embodiment, the wavelength scan (spectroscopic scan) range is 45 nm. Obviously, the central wavelengths of the local oscillator probe pulse beam Pl and the phase modulated probe pulse beam Pp, and the wavelength scan range, are merely examples thereof, and may be set to appropriate values according to the design of the light detection device and the like. Note that scanning of the central wavelength of the local oscillator probe pulse beam Pl is performed by rotating the bandpass filter 18 as described above.

As illustrated in <3> of FIG. 3B, for the delay frequency characteristics of the local oscillator probe pulse beam Pl and the phase modulated probe pulse beam Pp, the fixed delay time $\tau_{pr}$ with respect to the excitation pulse beam Pe is commonly imparted thereto. In the present exemplary embodiment, moreover, the nonlinear chirps caused by passing through the bandpass filters 16, 18 are respectively applied to the local oscillator probe pulse beam Pl and the phase modulated probe pulse beam Pp. In the present exemplary embodiment, the profile of the nonlinear chirp of the local oscillator probe pulse beam Pl and the profile of the nonlinear chirp of the phase modulated probe pulse beam Pp are set so as to be substantially the same profile.

As described above, the central frequency of the local oscillator probe pulse beam Pl and the central frequency of the phase modulated probe pulse beam Pp differ from each other. In the following explanation, the difference between the central frequency of the local oscillator probe pulse beam Pl and the central frequency of the phase modulated probe pulse beam Pp is referred to as the frequency difference $\Omega_R$. Note that in the present exemplary embodiment, a linear chirp resulting from passing through the optical modulator 21 is applied to the phase modulated probe pulse beam Pp in addition to the nonlinear chirp, and so the glass rod 17 having a linear chirp corresponding to this linear chirp is disposed on the optical path of the local oscillator probe pulse beam Pl to compensate therefor.

Due to adopting the above configuration, as illustrated in <1> of FIG. 3A, the local oscillator probe pulse beam Pl and the phase modulated probe pulse beam Pp each have temporally extended asymmetric waveforms. Imparting substantially equal amounts of chirp to pulses having substantially equal bandwidths results in a difference frequency between the temporally spread asymmetrical pulses being a constant frequency irrespective of time. This difference frequency is a difference between the central frequencies of the probe beams, namely equipment to the frequency difference $\Omega_R$. Of the molecular vibration excited by the excitation beam Le, only a vibration component matching the constant frequency difference $\Omega_R$ is converted in the light intensity modulation of the probe beams.

Namely, when the sample 33 is illuminated by the three pulse laser beams of the excitation pulse beam Pe, the local oscillator probe pulse beam Pl, and the phase modulated probe pulse beam Pp, plural molecular vibrations are first simultaneously excited by the excitation pulse beam Pe, and then energy exchange occurs between the probe beams due to the stimulated Raman scattering process by the local oscillator probe pulse beam Pl and the phase modulated probe pulse beam Pp, described later. When this occurs, the phase modulation applied to the phase modulated probe pulse beam Pp is converted into light intensity modulation of the local oscillator probe pulse beam Pl (and the phase modulated probe pulse beam Pp). The detected frequency is determined by the frequency difference $\Omega_R$ between the local oscillator probe pulse beam Pl and the phase modulated probe pulse beam Pp. The frequency resolution is, however, determined by the inverse of the pulse width, so the ability to discriminate between molecules is enhanced by applying stronger chirp.

Next, detailed explanation follows regarding a method to scan molecular vibration frequency according to the present exemplary embodiment, with reference to FIG. 4, namely, a method to set the frequency difference $\Omega_R$. In spectral focusing methods employing nonlinear chirps, the amount of optical delay between the local oscillator probe pulse beam Pl and the phase modulated probe pulse beam Pp needs to be kept equal at all times. The optical delay amount of the local oscillator probe pulse beam Pl also changes accompanying rotation of the bandpass filter 18, and so in the present exemplary embodiment a delay compensation mechanism is provided in the wavelength scanning section 24 to compensate for such change to the optical delay amount. More specifically, at the same time as each other a mechanism is driven to move the end mirror 20, this being a mirror to change the direction of the local oscillator probe pulse beam Pl, along the optical axis direction and a mechanism is driven to rotate the bandpass filter 18.

FIG. 4A illustrates wavelength dependency of a rotation angle θ of the bandpass filter 18. FIG. 4B illustrates wavelength dependency of an optical axis direction position Px of the end mirror 20 required to maintain the above optical delay amount at a predetermined constant value in a case in which the rotation angle θ of the bandpass filter 18 has been set as in FIG. 4A. Namely, FIGS. 4A and 4B illustrate calibration data for the bandpass filter 18 and the end mirror 20. The position Px in FIG. 4B is illustrated as a position with reference to a predetermined origin. For example, in cases in which a wavelength setting of 830 nm is desired, the rotation angle θ of the bandpass filter 18 should be approximately 44° as based on FIG. 4A. When this is performed, the optical delay amount will be maintained at the predetermined constant value when the position Px of the end mirror 20 is approximately −91.5 μm. Using the light detection device 10, a relationship may be measured in advance between the rotation angle θ of the bandpass filter 18 illustrated in FIG. 4A, and the position of the end mirror 20 illustrated in FIG. 4B, and this relationship stored in a table format or as a formula in a non-illustrated storage means such as ROM or the like. When this is performed, the reference position for the position Px may be determined in advance, and then instead of the position Px, displacement amounts from the reference position may be stored as optical path correction values M.

In the exemplary embodiment described above, employing the optical pulse pair (local oscillator probe pulse beam Pl and phase modulated probe pulse beam Pp) generated by the optical pulse pair generator with asymmetric time waveforms enables coherent Raman spectroscopy to be implemented with both a high frequency resolution and high sensitivity, while avoiding background noise. Moreover, employing bandpass filters not only as wavelength selection elements but also as waveform shaping elements to generate asymmetric pulses, and combining rotation of the bandpass filters with an optical delay compensation mechanism to accompany this rotation, enables shifting of the central frequency alone, without changing the time waveform.

Next, explanation follows regarding light detection processing executed by the light detection device 10 according to the present exemplary embodiment, with reference to FIG. 5. FIG. 5 is a flowchart illustrating a flow of processing in a light detection processing program according to the present exemplary embodiment. In the light detection device 10 according to the present exemplary embodiment, by instructing the start of light detection using a non-illustrated user interface (UI) or the like, a non-illustrated CPU provided inside the control section 44 reads the light detection processing program stored in a storage means such as ROM, expands the program in RAM or the like, and thereby executes the processing illustrated in FIG. 5.

First, at step S10, a start frequency Ωstart, an end frequency Ωend, and a frequency step width ΔΩstep are acquired for a spectroscopic scan (wavelength scan). The start frequency Ωstart, the end frequency Ωend, and the frequency step width ΔΩstep may each be stored in advance in a storage means such as ROM and then acquired by reading from the storage means, or may be acquired by being input through the non-illustrated UI on each occasion.

At step S11, a counter k to count the number of spectroscopic scans is cleared by setting a value of the counter k to 0.

At step S12, a molecular vibration frequency Ωdet to be detected is set using Equation 1 below.

$$\Omega det = \Omega start + k\Omega step \qquad \text{Equation 1}$$

At step S13, the corresponding rotation angle θ of the bandpass filter 18 and optical path correction value Δδ are acquired for the molecular vibration frequency Ωdet. As an example, the molecular vibration frequency f/det corresponds to the wavelengths on the horizontal axis of the graphs illustrated in FIGS. 4A and 4B, and the relationships between the rotation angles θ and the optical path correction values Δδ are stored in advance in table format in a storage means such as non-illustrated ROM. The corresponding rotation angle θ and optical path correction value Δδ for the molecular vibration frequency Ωdet are thereby acquired from this table.

At step S14, the rotation angle θ and the optical path correction value Δδ of the bandpass filter 18 are set to the values acquired at step S12.

At step S15, light detection processing is executed, and output data of a lock-in amplifier is acquired.

At step S16, an SRS signal (Raman scattering signal) is acquired from the output data of the lock-in amplifier acquired at step S15.

At step S17, determination is made as to whether or not the molecular vibration frequency Ωdet is smaller than the end frequency Ωend. Processing transitions to step S18 in cases in which this determination is affirmative determination and the counter k is incremented by 1 before returning to step S12. The light detection processing program is ended in cases in which this determination is negative.

Figure 6A:
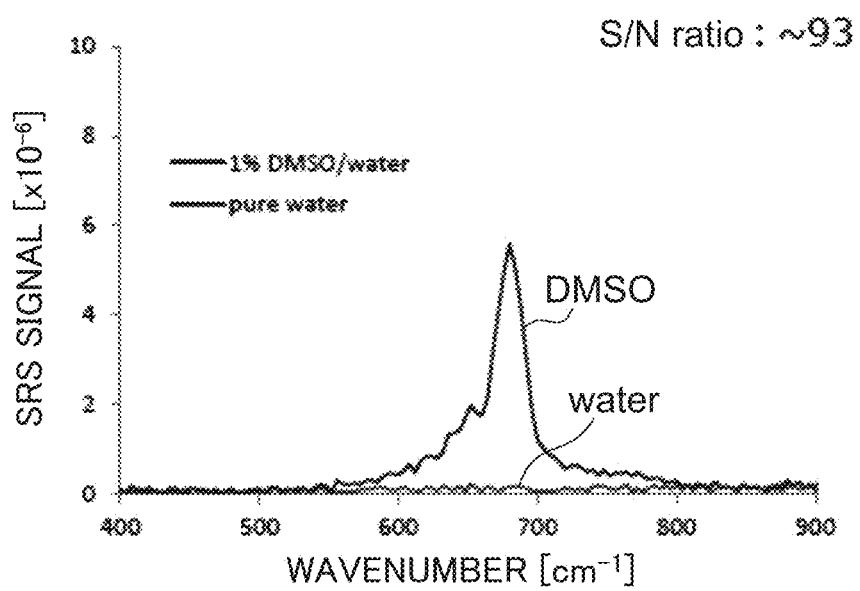
FIG. 6A is a graph illustrating detection results for a drug using a light detection device according to the present exemplary embodiment.
Figure 6B:
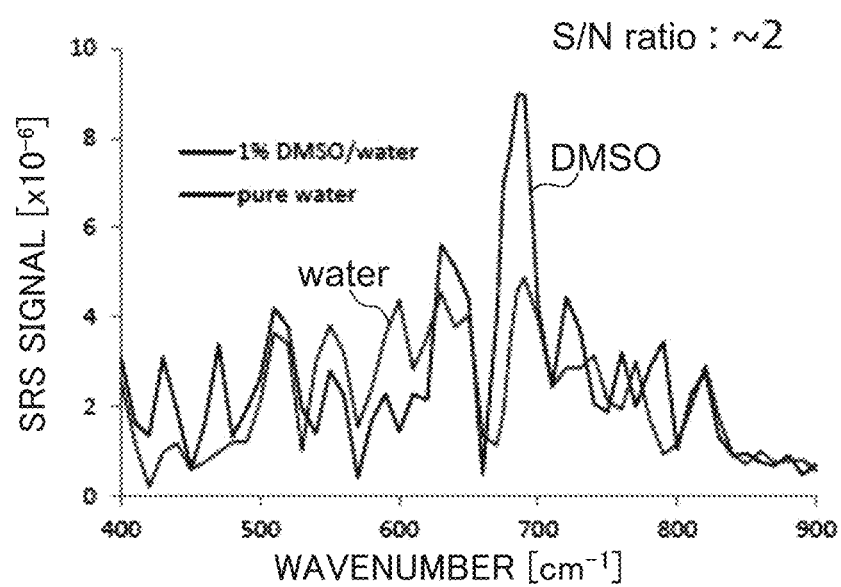
FIG. 6B is a graph illustrating detection results for a drug using a light detection device according to a Comparative Example.

Next, explanation follows, with reference to FIGS. 6A and 6B, regarding SRS signal detection results actually performed using the light detection device 10 according to the present exemplary embodiment, and these will be compared with those of a light detection device according to a Comparative Example. FIG. 6A illustrates SRS signal detection results using the light detection device 10, and FIG. 6B illustrates SRS signal detection results using the light detection device of the Comparative Example. Note that the light detection device of the Comparative Example is a device with similar configuration to that described in Non-Patent Document 4.

Raman spectroscopy measurements were executed with both the light detection device 10 and the light detection device according to the Comparative Example using an aqueous solution of dimethyl sulfoxide (DMSO) at 1% concentration as the sample. When this was performed, both the light detection devices had an integration time of 1 second (s). FIG. 6A and FIG. 6B illustrate detection results for DMSO and measurement results for water (labelled "water" in FIGS. 6A and 6B). As described above, the detection signal for water is a background molecular vibration, which manifests as noise in the light detection of the present exemplary embodiment. A ratio of the DMSO signal level to the water signal level defines the signal-to-noise (S/N) ratio.

As illustrated in FIG. 6A, the S/N ratio was approximately 93 in the SRS signal detection results of the light detection device 10. By contrast, as illustrated in FIG. 6B, the S/N ratio was approximately 2 in the SRS signal detection results of the light detection device of the Comparative Example. Namely, it can be seen that the light detection device 10 improves the S/N ratio by a factor of 40 relative to the light detection device according to the Comparative Example. As a result, the limit of concentration detectable in the light detection device according to the Comparative Example of 0.5% (equivalent to 70 mM (mols)) could be brought down to 0.01% (equivalent to 1.4 mM). Note that as illustrated in FIG. 6A, the wavenumber generated by Raman scattering for DMSO was about 672 $cm^{-1}$.

Figure 7:
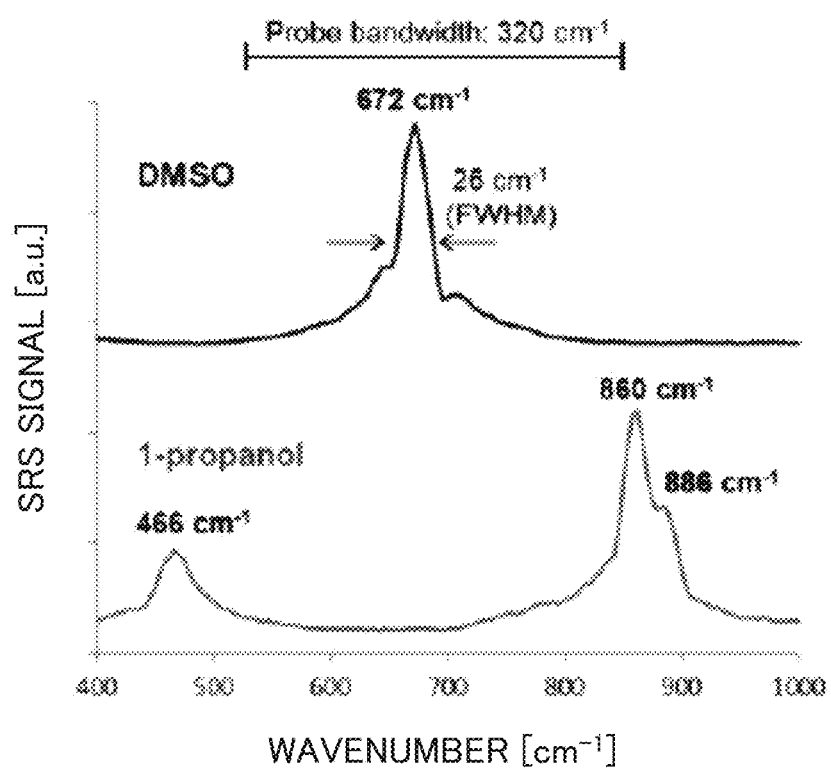
FIG. 7 is a graph illustrating detection results of a light detection device according to the present exemplary embodiment together with bandwidth of a probe pulse beam.

FIG. 7 illustrates an example of frequency resolution for DMSO detection. In FIG. 7, detection results for 1-propanol are also illustrated by way of comparison. As illustrated in FIG. 7, the wavenumber width of the SRS signal for the DMSO is a full width at half maximum (FWHM) of approximately 26 cm$^{-1}$. By contrast, since the wavenumber width of the probe beams is approximately 320 cm$^{-1}$ (equivalent to 20 nm), this wavenumber width of the SRS signal is no greater than one tenth the wavenumber width of the probe beams. It is accordingly apparent that a sufficient frequency resolution can be secured. It is accordingly also apparent from FIG. 7 that a similar resolution level is also obtained for the 1-propanol that has an SRS signal peak at approximately 860 cm$^{-1}$.

In a light detection device employing a time-resolved coherent Raman microscope, background noise called non-resonant background light is generated in cases in which there is temporal overlap between the excitation beam and the probe beams. As described above, in the light detection device and the light detection method according to the present exemplary embodiment, employing the asymmetric pulse beams generated in the optical pulse pair generator according to the present exemplary embodiment as the probe pulse beams enables a temporal separation from the excitation pulse beam to be achieved, thus enabling such background noise to be greatly reduced.

Moreover, in the light detection device and the light detection method according to the present exemplary embodiment, providing the delay time $\tau_{pr}$ enables Raman signals, which lie in a temporal region separated by at least 0.5 ps from the start point of the position of the excitation pulse beam, to be selectively probed. This enables removal of intense Raman scattering background light having a short relaxation time caused by water, lipids, or the like. Typically the life of the molecular vibrations of lots of small drug molecules is 0.5 ps or greater. Accordingly, the present exemplary embodiment enables the concentration distribution of the drug molecule being targeted to be imaged with high contrast. Moreover, in the optical pulse pair generator according to the present exemplary embodiment, despite having a simple configuration such as passive optical elements, there is little noise arising from sidelobes of the time waveforms, and high quality asymmetric pulse pairs can be generated. This enables molecule detection performance to be greatly improved (i.e. enables detectable concentration limits to be lowered).

Note that although explanation has been given regarding an embodiment in which the optical pulse pair generator is employed to generate the probe beams in the exemplary embodiment described above, there is no limitation thereto, and the optical pulse pair generator may be employed to generate the excitation beam. Namely, a device configuration that is the reverse of that described in the above exemplary embodiment may be adopted. Such a configuration is an embodiment in which a substantially identical asymmetric pulse pair having a slow rise and a rapid fall is employed as excitation beams, and a probe beam having a steep rise (for example a rise time of no greater than 0.5 ps) is employed to detect coherent Raman scattering light caused by molecular vibration. The waveform shaping in such cases may be performed using, in addition to a bandpass filter, an element that imparts strong nonlinear dispersion (for example a Gires-Tournois interferometer mirror or the like).

Moreover, the optical pulse pair generator according to the exemplary embodiment described above is not limited to measurement of coherent Raman scattering, and also may be applied to other light frequency conversion devices such as, for example, those employed in mid-infrared wave generation using difference frequencies, or terahertz wave generation using optical rectification. The pulse pair generator according to the present exemplary embodiment enables the implementation of a variable wavelength laser device having a wavelength band with an optical pulse pair or the like.

The disclosure of Japanese Patent Application No. 2018-093067, filed on May 14, 2018, is incorporated in its entirety into the present specification by reference herein.

All cited documents, patent applications, and technical standards mentioned in the present specification are incorporated by reference in the present specification to the same extent as if each individual cited document, patent application, or technical standard was specifically and individually indicated to be incorporated by reference.

EXPLANATION OF THE REFERENCE NUMERALS

10 light detection device
11 light source
12 waveform shaping section
13 PBS
14 ¼ wavelength plate
15 end mirror
16 bandpass filter
17 glass rod
18 bandpass filter
19 ¼ wavelength plate
20 end mirror
21 optical modulator
22 ¼ wavelength plate
23 end mirror
24 wavelength scanning section
25 microscope
26 polarizer
27 long pass filter
28 photodetector
29, 30, 31 mirror
32 object lens
33 sample
34 stage
40 excitation pulse beam adjustment section
41 local oscillator probe pulse beam adjustment section
42 phase modulated probe pulse beam adjustment section
43 light reception section
44 control section
pulse beam generation section
Le excitation beam
Ll local oscillator probe beam
Lp phase modulated probe beam
Lg multiplexed beam Lg
Ps light source pulse beam
Pe excitation pulse beam
Pl local oscillator probe pulse beam
Pp phase modulated probe pulse beam
$\tau_{pr}$ delay time
$\Omega_R$ frequency difference

The invention claimed is:

1. An optical pulse pair generator configured to generate an optical pulse pair including a first pulse beam and a second pulse beam having respective central wavelengths that are separated by a predetermined wavelength difference from each other and having target time waveforms that are substantially the same as each other, the optical pulse pair generator comprising:
a splitter section configured to split an incident pulse beam into two;
a first shaping section configured to shape one of the pulse beams split by the splitter section by shaping into the target time waveform and setting a central frequency so as to configure the first pulse beam; and a second shaping section configured to shape the other of the pulse beams split by the splitter section by shaping into the target time waveform so as to configure the second pulse beam, wherein the first pulse beam and the second pulse beam both have an asymmetric waveform with a fall time that is longer than a rise time, and are temporally superimposed on each other.

2. The optical pulse pair generator of claim 1, wherein:
the first shaping section includes a first bandpass filter having a bandwidth corresponding to the target time waveform of the one pulse beam and rotatable in a direction intersecting a propagation direction of the one pulse beam, and further includes a delay member configured to impart a variable time delay to the one pulse beam; and the second shaping section includes a second bandpass filter having a bandwidth corresponding to the target time waveform of the other pulse beam.

3. The optical pulse pair generator of claim 2, wherein:
a wavelength scanning section for scanning the wavelength difference is configured by the first bandpass filter and the delay member;
the first pulse beam and the second pulse beam are temporally superimposed on each other; and
the wavelength scanning section sets the wavelength difference by using a rotation angle of the first bandpass filter, and compensates a time difference between the first pulse beam and the second pulse beam accompanying rotation of the first bandpass filter by using the time delay of the delay member.

4. The optical pulse pair generator of claim 2, wherein the splitter section is configured by the second bandpass filter.

5. A light detection device comprising the optical pulse pair generator of claim 1 and configured to perform light detection using an excitation pulse beam, a first probe pulse beam, and a second probe pulse beam, wherein the first pulse beam configures the first probe pulse beam, the light detection device further comprising:
a laser light source configured to generate a light source pulse beam;
a light source splitter section configured to split the light source pulse beam in two by splitting into the excitation pulse beam and the incident pulse beam;
a modulation section configured to phase modulate the second pulse beam so as to configure the second probe pulse beam;
a multiplexing section configured to multiplex the excitation pulse beam, the first probe pulse beam, and the second probe pulse beam so as to generate a multiplexed beam;
an illumination section configured to illuminate a sample with the multiplexed beam; and
a detection section configured to employ heterodyne interference due to the first probe pulse beam and the second probe pulse beam to detect a molecular vibration excited by the excitation pulse beam when the multiplexed beam is illuminating the sample.

6. The light detection device of claim 5, wherein the first probe pulse beam and the second probe pulse beam both have an asymmetric waveform with a fall time that is longer than a rise time, are temporally superimposed on each other, and are delayed by a predetermined delay time relative to the excitation pulse beam.

7. The light detection device of claim 5, wherein:
the excitation pulse beam is polarized in advance;
a wavelength of the first probe pulse beam and a wavelength of the second probe pulse beam are different from each other;
the illumination section includes a microscope; and
the detection section includes a polarizer configured to remove the excitation pulse beam from the multiplexed beam after the sample has been illuminated, an optical filter configured to remove the second probe pulse beam from the multiplexed beam after the sample has been illuminated, and a light reception section configured to receive the first probe pulse beam.

8. The light detection device of claim 7, wherein:
the first shaping section includes a wavelength scanning section configured to scan the wavelength difference, the wavelength scanning section including a first bandpass filter having a bandwidth corresponding to the target time waveform of the one pulse beam and rotatable in a direction intersecting a propagation direction of the first pulse beam, and further including a delay member configured to impart a variable time delay to the one pulse beam; and
the light detection device further comprises a control section configured to control the wavelength scanning section so as to set the wavelength difference by using a rotation angle of the first bandpass filter and to compensate a time difference between the first probe pulse beam and the second probe pulse beam accompanying rotation of the first bandpass filter by using the time delay of the delay member, and further configured to control the modulation section so as to perform phase modulation with a modulation signal having a saw-tooth waveform including regions of linear change in phase for the second probe pulse beam transmitted through a second bandpass filter having a bandwidth corresponding to the target time waveform and including connection regions at which there is a steep change of phase difference $2\pi$.

9. The light detection device of claim 8, wherein the control section is configured to accept a received light signal output from the light reception section, to configure a lock-in amplifier using the received light signal and the modulation signal, and to detect an amplitude-modulated signal from modulating the first probe pulse beam resulting from heterodyne interference due to the lock-in amplifier as a signal corresponding to a stimulated Raman scattering signal.

10. The light detection device of claim 9, wherein:
the first bandpass filter applies a predetermined odd-number high order dispersion to the first probe pulse beam; and
the second bandpass filter applies the predetermined odd-number high order dispersion to the second probe pulse beam.

11. A method of detecting light of a molecular vibration using a light detection device including a laser light source configured to generate a light source pulse beam, a splitter section configured to split the light source pulse beam into three by splitting into an excitation pulse beam, and a first probe pulse beam and a second probe pulse beam that both have a predetermined waveform, a first shaping section configured to shape the first probe pulse beam by shaping into the predetermined waveform and setting a central frequency, a second shaping section configured to shape the second probe pulse beam by shaping into the predetermined waveform, a modulation section configured to phase modulate the second probe pulse beam, a multiplexing section configured to multiplex the excitation pulse beam, the first probe pulse beam, and the second probe pulse beam so as to generate a multiplexed beam, and an illumination section configured to illuminate a sample with the multiplexed beam, the light detection method comprising:

- setting a difference between a central wavelength of the first probe pulse beam and a central wavelength of the second probe pulse beam so as to be separated by a wavelength difference corresponding to a frequency of the molecular vibration;
- setting the predetermined waveforms so as to be substantially the same asymmetric waveforms having a fall time that is longer than a rise time;
- temporally superimposing the first probe pulse beam and the second probe pulse beam and delaying the first probe pulse beam and the second probe pulse beam relative to the excitation pulse beam by a predetermined delay time; and
- by a detection section, detecting a molecular vibration excited by the excitation pulse beam when the multiplexed beam is illuminating the sample by employing heterodyne interference due to the first probe pulse beam and the second probe pulse beam.

\* \* \* \* \*